(12) United States Patent
Miyamoto

(10) Patent No.: US 6,770,688 B1
(45) Date of Patent: Aug. 3, 2004

(54) WATER-BASED BALLPOINT INK COMPOSITION

(75) Inventor: Masaru Miyamoto, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/297,399

(22) PCT Filed: Dec. 8, 1997

(86) PCT No.: PCT/JP97/04480

§ 371 (c)(1),
(2), (4) Date: Apr. 29, 1999

(87) PCT Pub. No.: WO98/26016

PCT Pub. Date: Jun. 18, 1998

(30) Foreign Application Priority Data

Dec. 9, 1996 (JP) .............................................. 8-328754

(51) Int. Cl.[7] .............................................. C09D 11/00
(52) U.S. Cl. ...................... 523/161; 524/556; 524/557; 106/31.6; 106/31.69; 106/31.7
(58) Field of Search ................................. 523/160, 161; 524/556, 557; 106/31.6, 31.69, 31.7, 31.65, 31.85

(56) References Cited

U.S. PATENT DOCUMENTS

| 4,226,754 A | * | 10/1980 | Yun et al. .................... 524/561 |
| 4,545,818 A | | 10/1985 | Inoue et al. |
| 4,671,691 A | | 6/1987 | Case et al. |
| 4,822,417 A | * | 4/1989 | Kobayashi et al. .......... 524/308 |
| 5,281,261 A | * | 1/1994 | Lin ........................... 106/31.65 |
| 5,389,717 A | * | 2/1995 | Santini et al. ............... 524/575 |
| 5,425,806 A | * | 6/1995 | Doolan et al. ............ 106/203.1 |
| 5,466,281 A | * | 11/1995 | Hanke et al. ............. 106/31.38 |
| 5,478,602 A | * | 12/1995 | Shay et al. .................. 427/389 |
| 5,580,374 A | * | 12/1996 | Okumura et al. ............. 524/84 |
| 5,951,188 A | * | 9/1999 | Loftin ......................... 401/209 |
| 5,962,552 A | * | 10/1999 | Mikami et al. .............. 523/161 |

FOREIGN PATENT DOCUMENTS

| JP | Sho 54-98826 | | 12/1977 |
| JP | 54138732 | * | 10/1979 |
| JP | Sho 57-49678 | | 3/1982 |
| JP | Hei 6-346014 | | 12/1994 |

OTHER PUBLICATIONS

English Translation of JP 6364014, 1994.*
English Translation of JP 54138732, 1979.*
Lewis, Sr., Richard J.; Hawley's Condensed Chemical Dictionary 12th Ed., Van Nostrand Reinhold Company, New York (pp. 319 and 702), 1994.*
Abstract: JP, 7–66778, A (Pilot Corp.), Oct. 17, 1995.
Abstract: JP, 1–301760, A (Pentel Co., Ltd.), Dec. 5, 1989.
Abstract: JP, 8–73787, A (Seiko Epson Corp.), Mar. 19, 1996.

* cited by examiner

Primary Examiner—Callie Shosho
(74) Attorney, Agent, or Firm—Darby & Darby

(57) ABSTRACT

A water based ink composition for a ballpoint pen which is comprises an alkali-swelling associative thickener comprising a polymer having a carboxyl group and a hydrophobic group, a pigment, a polar solvent containing water, a pH controlling agent and other additives. It is a water based ink composition which is stable over a long period of time without settling of the pigment itself and can be filled into a ballpoint pen having simplified ink free type structure as is the case with a ballpoint pen using an oil based ink.

7 Claims, No Drawings

WATER-BASED BALLPOINT INK COMPOSITION

This application is a national phase application under 35 U.S.C. §371 of International Application No. PCT/JP97/04480, filed Dec. 8, 1997, which was published on Jun. 18, 1998 as International Publication No. WO 98/26016, and claims the benefit of Japanese Patent Application No. Hei 8-328754, filed Dec. 9, 1996.

TECHNICAL FIELD

The present invention relates to a water based pigment ink composition for a ballpoint pen, more specifically to a water based pigment ink composition used for a free ink type ballpoint pen having structure in which an ink is stored directly in an ink reservoir having a small diameter without using an ink absorber and a feed to be fed to a pen tip.

BACKGROUND ART

In general, an ink for a ballpoint pen includes a water based ink of a low viscosity containing a solvent comprising water and a water soluble solvent and having an ink viscosity of 10 mpa.s or less and an oil based ink containing a solvent such as a polyhydric alcohol and Cellosolve and having an ink viscosity of 1000 to 20000 mpa.s.

A ballpoint pen using an oil based ink has structure in which the ink adhered on a ball at a pen tip through an ink reservoir having a small diameter is transferred on a paper surface by rotation of the ball and only the transferred portion of the ink is fed to the pen tip through the reservoir.

A ballpoint pen using a water based ink has structure in which an ink is fed to a ball surface and a paper surface by means of capillary action of a feed prepared by binding fine fibers.

The foregoing water based ink and oil based ink for a ballpoint pen each have excellent advantages. On the other hand, however, they have various problems as well.

For example, since the water based ink has a low viscosity, the ink is fed by making use of a principle of capillary action. When the point portion of the ballpoint pen simply contacts paper, the capillary action is exerted on the contact point to feed the ink, and good lines can be written on a paper surface without applying so much writing pressure, so that splitting, starving and blobbing scarcely take place. On the other hand, the capillary action is exerted as well after transferring the ink on a paper surface to cause the drawn lines to feather, and storing the ink directly in the ink reservoir allows the ink to seep due to vibration or impact to make the amount of the ink to be fed to the ball unstable. Accordingly, complicated structure having a feed prepared by binding fine fibers is required. Further, there is a problem that it is difficult to confirm the amount of the ink reserved in the ballpoint pen.

On the other hand, the oil based ink is characterized by that because of a high viscosity thereof, the ink can be stored directly in the ink reservoir having a small diameter and the structure of the ballpoint pen can be simplified and that the remaining amount of the ink can be confirmed by using a transparent material for the ink reservoir and the ink transferred on a paper surface does not feather. On the other hand, there are problems that since the ink is transferred only on a paper surface contacted with the rotating ball, splitting and starving are liable to be caused if the ball rotates unstably and that since the ink hardly penetrates into a paper surface, blobbing which causes stain with the untransferred ink is apt to be caused.

In recent years, several countermeasures for solving such problems are reported. For example, the problems of feathering and seepage of an ink have been investigated in Japanese Patent Application Laid-Open No. Sho 54-98826 to provide a water based ink for a ballpoint pen in which gelatinizers (benzyl sorbitol and benzylidene xylitol or derivatives thereof) or a water soluble paste is added to provide the ink with thixotropy. Further, provided are a water based ink for a ballpoint pen in which the viscosity is increased by a cross linking type acrylic resin in Japanese Patent Application Laid-Open No. Sho 57-49678 and a water based ink for a ballpoint pen in which the viscosity is increased by xanthane gum in U.S. Pat. No. 4545818. However, they have problems of splitting and of stain caused by blobbing, and therefore they are not sufficiently satisfactory.

Further, it is shown in U.S. Pat. No. 4671691 to store a water based ink in a barrel of a simplified free ink type pen such as an oil based ballpoint pen, and disclosed therein is a ballpoint pen comprising a water based ink in which a water dispersible rubber or resin is added to provide a shear thinning property and a thinning index thereof falls in a range of from 0.01 to 0.6, and a viscoelastic follower. However, there are the defects that an ink subjected to shearing is not good in a flowing property and is slow in temporal viscosity recovery, so that a follow-up property of the ink in writing is inferior to bring about starving of the drawn lines and the ink seeps immediately after writing, and therefore the ballpoint pen is not sufficiently satisfactory.

Further, shown in Japanese Patent Application Laid-Open No. Hei 6-346014 is a water based ink for a ballpoint pen provided with thixotropy by a thickener comprising an emulsion to be thickened in alkaline. However, there are the problems that a settling action of a pigment can not be prevented only by an increase in the viscosity only with a swelling action of a carboxyl group contained in the thickener, so that the ink in the circumference of a rotary ball at the pen tip seeps and that the ink does not have a long term storing property. Accordingly, it is not sufficiently satisfactory.

An object of the present invention is to solve the problems on the conventional technologies described above and provide a water based ink composition which has a good follow-up property in writing and solves conventional defects such as splitting, poor water resistance and stain of drawn lines caused by blobbing and which does not cause seepage in the circumference of the rotary ball immediately after writing and is stable over a long period of time without settling of a pigment itself, wherein the water based ink composition can be filled in a ballpoint pen having structure in which an ink is stored directly in an ink reservoir to be fed to a pen tip, that is, a ballpoint pen having simplified free ink type structure as is the case with a ballpoint pen for a so-called oil based ink.

DISCLOSURE OF THE INVENTION

The present inventors have made researches in order to solve the problems described above, and as a result, they have come to complete a water based ink in which dispersibility of a pigment is kept stable over an extended period of time and a follow-up property of the ink in writing and quality of the drawn lines are excellent and which does not bring about seepage in the circumference of the rotary ball and can be stored in a ballpoint pen having simplified free ink type structure by using a thickener having a hydrophobic group and a hydrophilic group in a molecule which increases a viscosity by a steric hindrance resistance viscosity brought about by hydration swelling of the hydrophilic group in the thickener molecule and associative adsorption of the hydrophobic group and the hydrophilic group in the thickener molecule on the components contained in the ink composition instead of exerting a single thickening action brought about only by a steric hindrance resistance of the thickener molecule.

The water based ink composition of the present invention for a ballpoint pen is composed of an alkali-swelling associative thickener comprising a polymer having a carboxyl group as a hydrophilic group and a hydrophobic group, a pigment a polar solvent containing water, a pH controlling agent and other additives. Preferred is the water based ink composition for a ballpoint pen in which the alkali-swelling associative thickener described above is contained in a proportion of 0.1 to 8% by weight (polymer component) based on the ink composition and increases the ink viscosity by dissolving and swelling in an alkaline area in the polar solvent containing water to associate with the particle surface of the pigment. More preferred is the water based ink composition for a ballpoint pen in which the particle surface of the pigment is subjected to surface treatment with a pigment surface-treating agent.

BEST MODE FOR CARRYING OUT THE INVENTION

The alkali-swelling associative thickener used for the ink composition of the present invention has two thickening actions. The first thickening action is the action in which the thickener is dissolved only in an alkaline area in water or a mixture of water and a polar solvent and a hydrophilic group such as a carboxylic group in the molecule is hydrated and swollen to produce a steric hindrance resistance, whereby the viscosity goes up. The second thickening action is the action in which a hydrophobic group and a hydrophilic group in the molecule are associatively adsorbed on the components in the ink, for example, a pigment, a solvent and a surfactant to form a network-like aggregate, whereby the viscosity goes up. The first thickening action of the present thickener brought about by swelling in alkaline can provide an ink of a pseudo-plastic fluid which is reduced in a viscosity by applying shearing force. Since the shearing force is applied to the ink in writing, the viscosity of the ink is reduced and the follow-up property of the ink is improved, so that the drawn lines having no splitting can be obtained. The property of the present thickener that it is soluble only in an alkaline area results in providing the drawn lines with water resistance because of insolubility in city water and rainwater almost all of which fall in an acid area.

The second thickening action of the present thickener exerted by the associative property is brought about by allowing the pigment particles to form a network-like aggregate with the thickener. As a result the pigment itself contained in the ink is inhibited from settling over a long period of time, and seepage of the ink in the circumference of the rotary ball immediately after writing is prevented by allowing the ink to which shearing force is applied to recover soon from the reduced viscosity and to become a non-thixotropic fluid, whereby the drawn lines having no stain caused by blobbing can be obtained.

The water based ink for a ballpoint pen of the present invention which can be stored over an extended period of time has been achieved by having both of these two thickening actions, and even if the water based ink is stored in a simplified ink free type ballpoint pen such as a ballpoint pen using an oil based ink which has structure in which an ink is stored directly in a barrel to be fed to a rotary ball at a pen tip, the ink does not seep from the circumference of the rotary ball, and the writing property is good, so that the excellent drawn lines can be obtained.

The alkali-swelling associative thickener used in the present invention comprises a polymer having a carboxyl group and a hydrophobic group. The hydrophobic group includes, for example, linear and cyclic hydrocarbon groups, an aromatic hydrocarbon group, a halogenated alkyl group, an organosilicon group ($SiR_3$) and a fluorinated carbon group ($C_nF_{2n+1}$).

Specific examples of the polymer include polyacrylic acid, polymethacrylic acid, polyacrylic acid copolymers and polymethacrylic acid copolymers. The commercial products include "Primal TT-935", "Primal TT-950", "Primal TT-615" and "RM-825" each manufactured by Rohm & Haas Co., Ltd.

These alkali-swelling associative thickeners have a content falling in a range of from 0.1 to 8% by weight, preferably 0.1 to 2.0% by weight based on the ink composition in terms of the polymer component. "RM-4" and "RM-5" each having a few hydrophobic group manufactured by Rohm & Haas Co., Ltd., though they are the alkali-swelling thickness, have little associative property and do not have the thickening actions described above.

A colorant component used for the ink composition of the present invention shall not specifically be restricted, and pigments usually used for water based inks are used. To be specific, they include inorganic pigments such as carbon black, iron oxide, titanium oxide and metal powders, organic pigments such as azos, anthraquinones, condensed polyazos, thioindigos, metal complex salts, phthalocyanines, perinone perylenes, dioxazines and quinacridones, white pigments which are polymer particles themselves obtained by emulsion polymerization, and dyed pseudo-pigments and water based dispersions of dyed pseudo-pigments both of which are obtained by dyeing polymer particles with fluorescent dyes and dyes.

These pigments may be added either alone or in combination of two or more kinds thereof, and the content thereof falls usually in a range of from 3 to 50% by weight, preferably 5 to 30% by weight based on the whole ink composition.

When a hydrophobic group and a hydrophilic group are present on the surface of these pigment particles, a network-like aggregate is formed by associative adsorption thereof with an alkali-swelling associative thickener, and the thickening effect can be promoted. The preferred particle diameter of the pigment is 500 nm or less.

When associative adsorption on a functional group on the surface of the pigment itself is small, a pigment surface-treating agent is adsorbed on the surface of the pigment, and the thickening effect can be promoted by associative adsorption of the functional groups thereof with the alkyl-swelling associative thickener.

The pigment surface-treating agent includes water soluble polymers and surfactants. The water soluble polymers include polyacrylic acid resins, styrene.acrylic acid resins, styrene.maleic acid resins, polyvinyl alcohol, polyvinylpyrrolidone, polyethylene.polyethylene glycol copolymers, alginic acid and cellulose, and the surfactants include nonionic surfactants such as fatty acid esters of polyhydric alcohols, higher fatty acid esters of sugar, polyoxyalkylene higher fatty acid esters and alkylphosphoric acid esters, and anionic surfactants such as alkylsulfonic acid salts of higher fatty acid amides and alkylarylsulfonic acid salts.

These pigment surface-treating agents each may be used alone or in combination of two or more kinds thereof, and the content thereof is preferably 0.1 to 5.0% by weight based on the ink composition, but the range thereof shall not be restricted.

A polar solvent containing water is used for the ink composition of the present invention, and water is used as the main solvent. All solvents which are miscible with water and have polar groups can be used as the other polar solvents. There can be used, for example, ethylene glycol, diethylene glycol, triethylene glycol, polyethylene glycol, propylene glycol, dipropylene glycol, polypropylene glycol, thiodiglycol, methyl cellosolve, butyl cellosolve, methyl carbitol, ethyl carbitol, glycerin, polyglycerin, pyrrolidone and triethanolamine. They can be used alone or in combination of two or more kinds selected from them. The content thereof is 5 to 50% by weight, preferably 10 to 30% by weight based on the ink composition.

Other additives include as lubricants, nonionic surfactants such as fatty acid esters of polyhydric alcohols, higher fatty acid esters of sugar, polyoxyalkylene higher fatty acid esters and alkylphosphoric acid esters, anionic surfactants such as alkylsulfonic acid salts of higher fatty acid amides and alkylarylsulfonic acid salts, which are used for the pigment surface-treating agents, derivatives of polyalkylene glycols, fluorine base surfactants and polyether-modified silicones.

Rust preventives include benzotriazole, tolyltriazole, dicyclohexylammonium nitrite and saponins, and pH controlling agents include ammonia, urea, triethanolamine, aminomethylpropanol and sodium hydroxide. Preservatives or fungicide include phenol, sodium omadine, sodium benzoate and benzimidazole base compounds.

A production process of the water based pigment ink composition for a ballpoint pen of the present invention are composed of three steps of a dispersion step for a pigment, an ink-preparing step and a thickening step.

The pigment dispersion step comprises sufficiently dispersing a pigment, a surface treating agent, a solvent, water and additives, by means of a bead mill, a ball mill, three rolls or a high-speed mixer and then centrifuging and filtering the dispersion to remove coarse particles, whereby an aqueous dispersion of the pigment is obtained.

When polymer particles obtained by emulsion polymerization are used as the pigment, they are diluted to a suitable concentration and dyed with a dye. Then, they are centrifuged and filtered, whereby the similar aqueous dispersion of the pigment can be obtained.

Attention has to be paid to the dispersion state of the pigment itself and to the kind and the content of the surface treating agent since there is the possibility that the associative thickening action changes at the subsequent thickening step. As described above, included is, for example, controlling of the pigment particle diameter to 500 nm or less.

At the ink-preparing step, the aqueous dispersion of the pigment, water and the remaining components required for the water based ink for a ballpoint pen and a controlling agent required for the alkali-swelling thickening action and the associative thickening action are blended and sufficiently stirred by means of a stirrer until a homogeneous solution is obtained.

At the thickening step, the thickener, which is dissolved and diluted with water and a polar solvent, is added to the water based pigment ink prepared at the ink-preparing step and sufficiently blended by means of a stirrer until a homogeneous solution is obtained. Finally, coarse particles are preferably removed once again by centrifugation and filtering.

EXAMPLES

The present invention shall more specifically be explained below with reference to examples, but the present invention shall not be restricted by these examples.

The ink compositions obtained in the examples and the comparative examples were tested by the following methods.

Initial Particle Diameter of Pigment

The average particle diameter (nm) was determined by means of NICOMP 370(manufactured by Nozaki & Co., Ltd.) according to a photon correlation method within a week after preparing the links.

Particle Diameter of Pigment After Six Months

After leaving standing at room temperature for six months after preparing the inks, the particle diameter (nm) was determined by the same method as used in measuring the initial particle diameter.

Viscosity of the Inks

The viscosity value (mPa.s) at 1 rpm was determined at 25° C. by means of an EMD type viscometer (manufactured by Toki Sangyo Co., Ltd.).

Ink-seeping Resistance

The ink was filled into a refill comprising a polypropylene-made ink reservoir having an inner diameter of 3.5 mm and a length of 100 mm and having no feed and a stainless steel-made pen tip having a ball diameter of 0.5 mm. This refill was left standing at room temperature for 24 hours with the pen tip part turned downward, and then an ink-seeping state in the circumference of the ball at the pen tip part was judged with eyes according to the following criteria:

⊚: no ink seepage in the circumference of the ball at the pen tip part

○: slight ink seepage in the circumference of the ball at the pen tip part

Δ: a little ink seepage in the circumference of the ball at the pen tip part

×: very much ink seepage in the circumference of the ball at the pen tip part

Writing Property

The same pen as described above was prepared and used for quick writing, and the presence of starving and splitting in the resulting lines was judged with eyes according to the following criteria:

⊚: no starving and splitting

○: slight starving and splitting

Δ: a little starving and splitting

×: very much starving and splitting

Examples 1 to 4

Pigment Dispersion Step

Sufficiently dispersed and blended by means of a dissolver were 8.0 parts by weight of carbon black, 6.0 parts by weight of a 30% styrene-maleic acid aqueous solution as a pigment surface-treating agent, 5.0 parts by weight of propylene glycol as a polar solvent, 30.8 parts by weight of water and 0.2 part by weight of aminomethylpropanol as a pH controlling agent. Then, the solution was filtered to remove coarse particles, whereby an aqueous dispersion of the pigment having a pH of 9.0 was obtained.

Ink-preparing Step

Added to the aqueous dispersion of the pigment obtained at the step described above were 0.5 part by weight of phosphoric ester as an adjusting agent, 15.0 parts by weight of propylene glycol as a polar solvent, 28.0 parts by weight (Examples 2 and 4) or 31.0 parts by weight (Examples 1 and 3) of water, 0.1 part by weight of aminomethylpropanol as a pH controlling agent and 0.4 part by weight of a rust preventive and a fungicide, and they were sufficiently blended by means of a stirrer until a homogeneous solution was obtained, whereby a raw ink solution having a pH of 9.0 was obtained.

Thickening Step

A 10% aqueous solution of an alkali-swelling associative thickener was prepared and a prescribed amount thereof (Table 1) was added to the raw ink solution prepared at the ink-preparing step and sufficiently blended by means of a stirrer until homogeneous solution was obtained. Finally, coarse particles were removed once again by filtering, whereby a water based ink composition for a ballpoint pen having an adjusted viscosity was obtained.

Test results of these ink compositions are shown in Table 1.

Examples 5 to 8

Water based ink compositions were obtained at recipes shown in Table 2 in the same manner as Examples 1 to 4.

Test results of these ink compositions are shown in Table 2.

Comparative Examples 1 to 4

The alkali-swelling associative thickeners were changed to xanthane gum (Comparative Examples 1 and 2), polyacrylic acid (Comparative Example 3) and an emulsion to be thickened in alkaline (Comparative Example 4), whereby water based ink compositions were obtained at recipes shown in Table 3 in the same manner as the examples.

Test results of these ink compositions are shown in Table 3.

Components to which note numbers were put in Tables 1 to 3 are as follows:

1 Carbon black: MFC-88 (manufactured by Mitsubishi Chemicals Corporation)
2 Naphthol red: FuJi Red 2510 (manufactured by Fuji Dye Co., Ltd.)
3 Phosphoric acid ester: RS-610 (manufactured by Toho Chemical Industry Co., Ltd.)
4 Primal TT-935 (manufactured by Rohm & Haas Co., Ltd.) was diluted with water to adjust a polymer component to 10%.
5 Primal TT-615 (manufactured by Rohm & Haas Co., Ltd.) was diluted with water to adjust a polymer component to 10%.
6 Kelzan (manufactured by Sansho Co., Ltd.) was diluted with water to adjust a polymer component to 10%.
7 Hiviswako 104 (manufactured by Wako Pure Chemical Industries, Ltd.) was diluted with water to adjust a polymer component to 10%.
8 Primal RM-5 (manufactured by Rohm & Haas Co., Ltd.) was diluted with water to adjust a polymer component to 10%.

TABLE 1

| | Example | | | |
|---|---|---|---|---|
| | 1 | 2 | 3 | 4 |
| Dispersion step | | | | |
| Carbon black *1 | 8.0 | 8.0 | 8.0 | 8.0 |
| Styrene-maleic acid 30% aqueous solution | 6.0 | 6.0 | 6.0 | 6.0 |
| Aminomethylpropanol | 0.2 | 0.2 | 0.2 | 0.2 |
| Propylene glycol | 5.0 | 5.0 | 5.0 | 5.0 |
| Water | 30.8 | 30.8 | 30.8 | 30.8 |
| Ink-preparing step | | | | |
| Phosphoric acid ester *3 | 0.5 | 0.5 | 0.5 | 0.5 |
| Aminomethylpropanol | 0.1 | 0.1 | 0.1 | 0.1 |
| Propylene glycol | 15.0 | 15.0 | 15.0 | 15.0 |
| Water | 31.0 | 28.0 | 31.0 | 28.0 |
| Rust preventive and fungicide | 0.4 | 0.4 | 0.4 | 0.4 |
| Thickening | | | | |
| Associative thickener 10% aqueous solution *4 | 3.0 | 6.0 | | |
| Associative thickener 10% aqueous solution *5 | | | 3.0 | 6.0 |
| Test items | | | | |
| Pigment initial particle diameter (nm) | 110 | 122 | 116 | 128 |
| Pigment particle diameter after 6 months (nm) | 112 | 123 | 115 | 128 |
| Viscosity of ink (mPa · s) | 115 | 186 | 195 | 326 |
| Ink-seeping resistance | ○ | ○ | ○ | ○ |
| Writing property | ○ | ○ | ○ | O |

TABLE 2

| | Example | | | |
|---|---|---|---|---|
| | 5 | 6 | 7 | 8 |
| Dispersion step | | | | |
| Naphthol red *2 | 7.0 | 7.0 | 7.0 | 7.0 |
| Phosphoric acid ester *3 | | | 0.5 | |
| Styrene-maleic acid 30% aqueous solution | 6.0 | 6.0 | 6.0 | 6.0 |
| Aminomethylpropanol | 0.2 | 0.2 | 0.2 | 0.2 |
| Propylene glycol | 5.0 | 5.0 | 5.0 | |
| Glycerin | | | | 5.0 |
| Water | 31.8 | 31.8 | 31.8 | 31.8 |
| Ink-preparing step | | | | |
| Phosphoric acid ester *3 | 0.5 | 0.5 | | 0.5 |
| Aminomethylpropanol | 0.1 | 0.1 | 0.1 | 0.1 |
| Propylene glycol | 15.0 | 15.0 | 15.0 | |
| Glycerin | | | | 15.0 |
| Water | 30.0 | 26.0 | 30.0 | 28.0 |
| Rust preventive and fungicide | 0.4 | 0.4 | 0.4 | 0.4 |
| Thickening | | | | |
| Associative thickener 10% aqueous solution *4 | | | | 6.0 |
| Associative thickener 10% aqueous solution *5 | 4.0 | 8.0 | 4.0 | |
| Test items | | | | |
| Pigment initial particle diameter (nm) | 95 | 115 | 121 | 107 |
| Pigment particle diameter after 6 months (nm) | 97 | 115 | 120 | 108 |
| Viscosity of ink (mPa · s) | 218 | 405 | 383 | 211 |
| Ink-seeping resistance | ○ | ○ | ○ | ○ |
| Writing property | ○ | O | O | O |

TABLE 3

| | Comparative Example | | | |
|---|---|---|---|---|
| | 1 | 2 | 3 | 4 |
| Dispersion step | | | | |
| Carbon black *1 | 8.0 | 8.0 | | 8.0 |
| Naphthol red *2 | | | 7.0 | |
| Styrene-maleic acid 30% aqueous solution | 6.0 | 6.0 | 6.0 | 6.0 |

TABLE 3-continued

|  | Comparative Example | | | |
|---|---|---|---|---|
|  | 1 | 2 | 3 | 4 |
| Aminomethylpropanol | 0.2 | 0.2 | 0.2 | 0.2 |
| Propylene glycol | 5.0 | 5.0 | 5.0 | 5.0 |
| Water | 30.8 | 28.8 | 31.8 | 18.8 |
| Ink-preparing step | | | | |
| Phosphoric acid ester *3 | 0.5 | 0.5 | 0.5 | 0.5 |
| Aminomethylpropanol | 0.1 | 0.1 | 0.1 | 0.1 |
| Propylene glycol | 15.0 | 15.0 | 15.0 | 15.0 |
| Water | 30.0 | 28.0 | 28.0 | 26.0 |
| Rust preventive and fungicide | 0.4 | 0.4 | 0.4 | 0.4 |
| Thickening | | | | |
| Xanthane gum 10% aqueous solution | 4.0 | 8.0 | | |
| Polyacrylic acid 10% aqueous solution *7 | | | 6.0 | |
| Alkali-thickened emulsion *8 | | | | 20.0 |
| Test items | | | | |
| Pigment initial particle diameter (nm) | 121 | 143 | 117 | 113 |
| Pigment particle diameter after 6 months (nm) | 397 | 685 | 264 | 281 |
| Viscosity of ink (mPa · s) | 301 | 452 | 293 | 196 |
| Ink-seeping resistance | ◯ | ◯ | Δ | X |
| Writing property | Δ | X | Δ | Δ |

The following are apparent from the results shown in Table 1 to Table 3.

The ink compositions obtained in the examples do not change in the pigment particles over an extended period of time. That is, the pigments do not coagulate to grow large, and therefore the stability can be maintained over a long period of time without causing settling. Further, if the ink composition of the present invention is filled into a pen having simplified free ink type ballpoint pen structure having no ink absorber and feed, ink seepage in the circumference of the rotary ball at the pen tip not caused, and the written lines have little starving and splitting.

Industrial Applicability

The water based ink composition for a ballpoint pen of the present invention has a good follow-up property of the ink in writing, and the written lines are in the state that skipping, starving, splitting and stain by blobbing are not caused and the water resistance is good as well. Further, it is a water based ink composition which is stable over a long period of time without settling of the pigment itself and can be filled into a ballpoint pen of a simplified free ink type having no ink absorber and feed.

What is claimed is:

1. A water based ink composition for a ballpoint pen which comprises (i) a thickener which is associative and swells in an alkaline medium, said thickener comprising a polymer having a carboxyl group and a hydrophobic group selected from the group consisting of a linear hydrocarbon, a halogenated alkyl, an organosilicon group, and a fluorinated carbon group, (ii) pigment particles having a diameter of 500 nm or less which have been subjected to surface treatment with a water soluble polymer and a surfactant wherein the water-soluble polymer is selected from the group consisting of stryene-acrylic acid resins, styrene-maleic acid resins, polyvinyl alcohol, polyethylene-polyethylene glycol copolymers, alginic acid, and cellulose, iii) a polar solvent comprising water and other water-miscible solvents and (iv) a pH controlling agent, wherein the pigment particle diameter is stable at room temperature over a 6 month period and the water based ink composition has a viscosity of 100 mPa.s or more.

2. The water based ink composition for a ballpoint pen as described in claim 1, wherein the thickener is contained in a proportion of 0.1 to 8% by weight based on the ink composition and dissolves and swells in the polar solvent to associate with the particle surface of the pigment, thereby increasing the ink viscosity.

3. The water based ink composition of claim 1, wherein said thickener is present in the amount of 0.1 to 2.0% by weight based on the ink composition.

4. The water based ink composition for a ballpoint pen of claim 1 wherein the hydrophobic group is a linear hydrocarbon.

5. The water based ink composition for a ballpoint pen of claim 1 wherein the hydrophobic group is a halogenated alkyl.

6. The water based ink composition for a ballpoint pen of claim 1 wherein the hydrophobic group is an organosilicon group.

7. The water based ink composition for a ballpoint pen of claim 1 wherein the hydrophobic group is a fluorinated carbon group.

* * * * *

UNITED STATES PATENT AND TRADEMARK OFFICE
CERTIFICATE OF CORRECTION

PATENT NO. : 6,770,688 B1  Page 1 of 1
DATED : August 3, 2004
INVENTOR(S) : Masaru Miyamoto It is certified that error appears in the above-identified patent and that said Letters Patent is hereby corrected as shown below:

<u>Title page,</u>
Item [54], delete "WATER-BASED BALLPOINT INK COMPOSITION" and substitute -- WATER BASED INK COMPOSITION FOR BALLPOINT PEN --.

Signed and Sealed this

Sixteenth Day of November, 2004

JON W. DUDAS
*Director of the United States Patent and Trademark Office*